Dec. 14, 1943.  J. P. BADENHAUSEN  2,336,833
STEAM GENERATOR
Filed Feb. 19, 1942  2 Sheets-Sheet 1

Inventor:
John Phillips Badenhausen,
By B. T. Wobensmith
Attorney.

Dec. 14, 1943.        J. P. BADENHAUSEN        2,336,833
STEAM GENERATOR
Filed Feb. 19, 1942        2 Sheets-Sheet 2

Inventor:
John Phillips Badenhausen,
By B. T. Wobensmith 2nd
Attorney.

Patented Dec. 14, 1943

2,336,833

UNITED STATES PATENT OFFICE 2,336,833

STEAM GENERATOR

John Phillips Badenhausen, Philadelphia, Pa.

Application February 19, 1942, Serial No. 431,458

3 Claims. (Cl. 122—7)

This invention relates to steam generators, and more particularly to a steam generator which is adapted for the absorption of heat from waste heat gases, and for auxiliary absorption of heat from burning fuel.

In the waste heat boilers which have heretofore been available, particularly for use with open hearth steel furnaces, a very large heating surface has been required in the steam generating unit because of the relatively low temperature, of the order of 1,000° F., of the waste heat gas from the open hearth furnace. This large heating surface required an expenditure greatly in excess of that ordinarily justified, particularly when considered from the viewpoint of the quantity of steam generated in the waste heat boiler. Various attempts have heretofore been made to utilize the large heating surface of waste heat boilers to increase the steam output but many difficulties have been encountered. No wholly satisfactory provisions have heretofore been made for using auxiliary fuel with a waste heat boiler, and for utilizing the burning of auxiliary fuel for heat absorption by the large heat absorbing surface of the waste heat boiler. In some instances, attempts have been made to mix gases of combustion from an auxiliary furnace with the waste heat gases in the waste heat boiler. The gases from the auxiliary furnace were of such high temperature that the metallic particles entrained in the waste heat gases were rendered plastic. The plastic particles froze on the heating surfaces and blanketed the same so that steam generation could not be properly effected.

In accordance with the present invention, a steam generator is provided which is particularly adapted for the absorption of heat from waste heat gases from open hearth furnaces, with which auxiliary fuel may be employed, and which is also suitable for operation wholly with the auxiliary fuel at such times as waste heat gases from the open hearth furnaces are not available. The necessity for using other steam generators in the plant to supply the steam demand is thus eliminated.

It is the principal object of the present invention to provide a steam generator suitable for heat absorption from waste heat gases and from gases of combustion of auxiliary fuel.

It is a further object of the present invention to provide a steam generator which is particularly adapted for use with open hearth steel furnaces.

It is a further object of the present invention to provide a waste heat steam generator for operation at higher pressures than those heretofore employed.

It is a further object of the present invention to provide a steam generator which is for alternative operation as desired with waste heat gases and auxiliary fuel.

It is a further object of the present invention to provide a steam generator for waste heat steam generation which is suitable for independent operation, if desired, with auxiliary fuel.

Other objects of the invention will be apparent from the annexed specification and claims.

The nature and characteristic features of the invention will be more readily understood from the following description, taken in connection with the accompanying drawings forming part hereof, in which.

Figure 1:
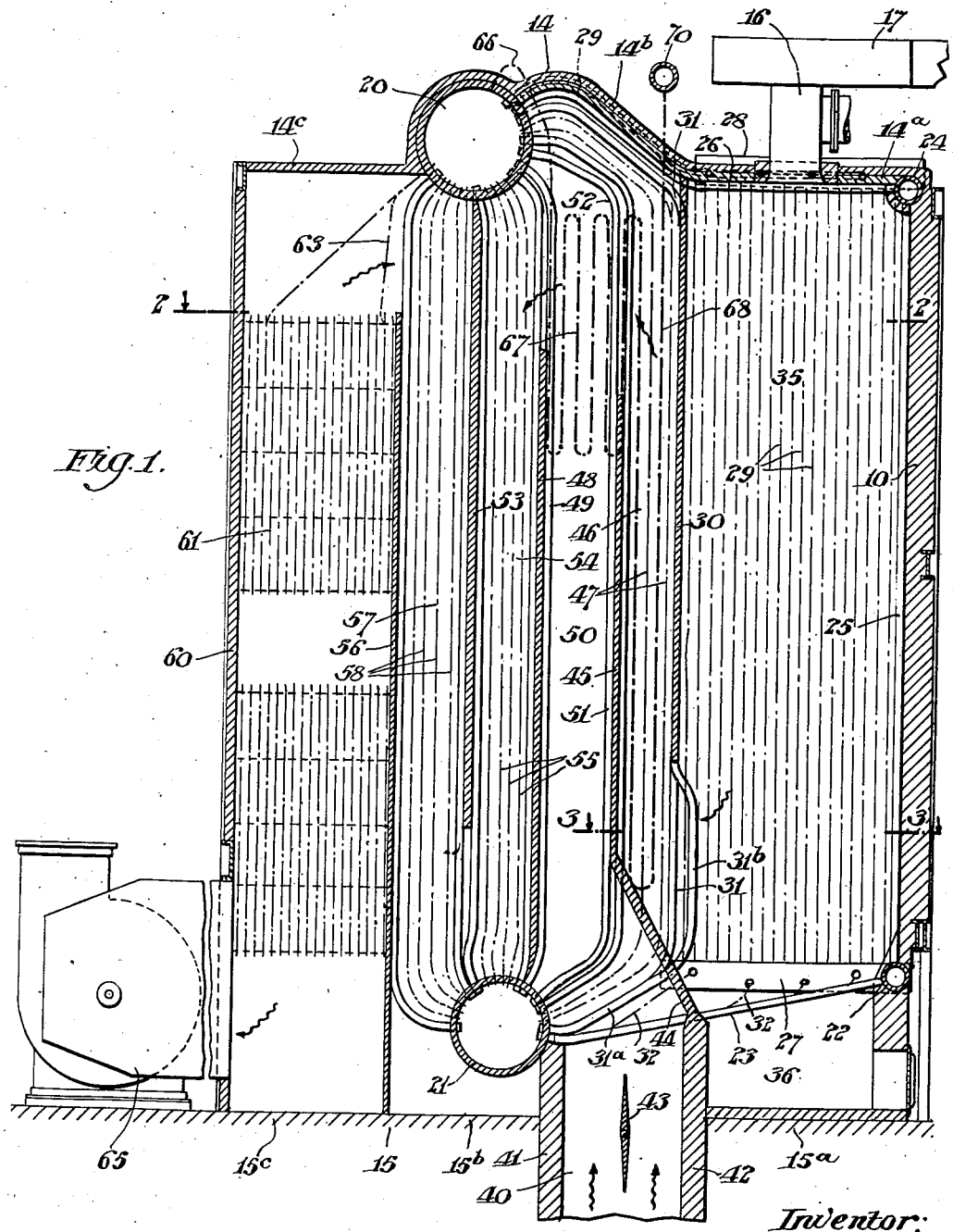
Figure 1 is a vertical central sectional view through a preferred embodiment of steam generator in accordance with the present invention, taken approximately on the line 1—1 of Fig. 2.
Figure 2:
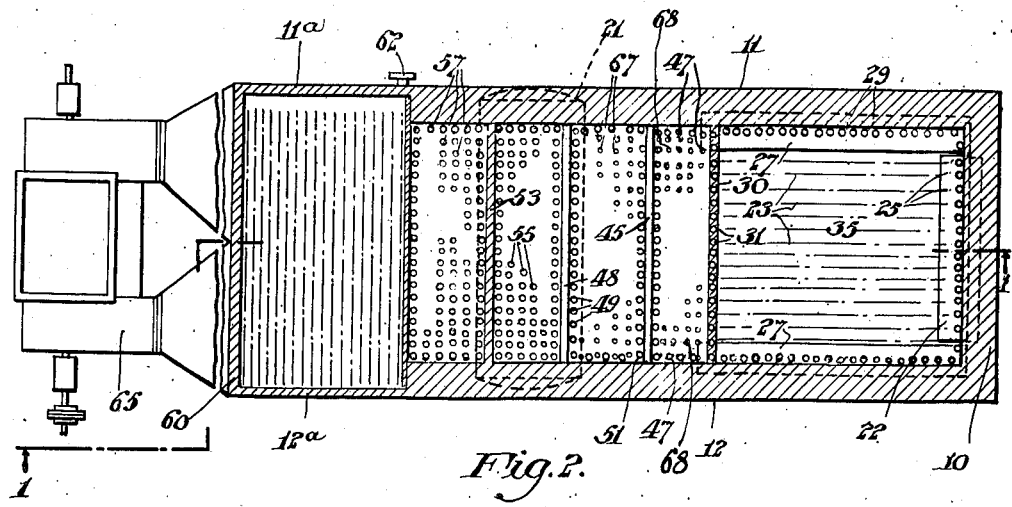
Fig. 2 is a horizontal section taken approximately on the line 2—2 of Fig. 1.

It will, of course, be understood that the description and drawings herein are illustrative merely, and that various modifications and changes may be made in the structure disclosed without departing from the spirit of the invention.

Referring more particularly to the drawings, the steam generator, in accordance with the present invention, is suitably enclosed and includes a vertical front wall 10, vertical side walls 11 and 12 having rear extensions 11$^a$ and 12$^a$, a top wall 14 having a front section 14$^a$, an intermediate section 14$^b$ and a rear section 14$^c$, and a floor 15 having a front section 15$^a$, an intermediate section 15$^b$ and a rear section 15$^c$. The front section 14$^a$ of the top wall 14 is provided with a burner 16 for introducing pulverized coal, oil, gas or any desired fuel together with air supplied by an air duct 17 from a forced draft fan (not shown).

An upper transverse steam and water drum 20 is provided at the rear portion of the intermediate top wall section 14$^b$, and spaced therebelow and near the intermediate floor section 15$^b$, a transverse lower water drum 21 is provided. A lower front wall header 22 is provided near the bottom of the front wall 10, and is connected to the lower water drum 21 by a bank of tubes 23. An upper front wall header 24 is provided at the junction of the front wall 10 and the front top wall section 14$^a$, the lower water header 22 and the upper header 24 being connected by a bank of steam generating tubes 25 which line the front wall 10. The upper front wall header 24 is connected by a bank of tubes 26 which extend substantially horizontally along the lower side of the front top wall section 14$^a$ and then upwardly along the intermediate top wall section 14$^b$ and into the steam and water drum 20. The tubes 26 of the bank of tubes are preferably shaped so as not to interfere with the burner 16.

A lower side wall header 27 is provided in each of the side walls 11 and 12, and spaced upwardly from the front floor section 15a. The drum 21 is connected to each of the headers 27 by tubes 32. An upper side wall header 28 is provided in each of the side walls 11 and 12 at the upper ends thereof. The lower side wall headers 27 are respectively connected to the upper side wall headers 28 by banks of steam generating tubes 29 which line the front side wall sections of the side walls 11 and 12. The upper side wall headers 28 are connected by banks of tubes 29 to the steam and water drum 20 for the delivery of steam thereto.

A baffle 30 is provided, spaced rearwardly from the front wall 10, and extends downwardly from the top wall 14, the lower end being terminated to permit gas flow therearound as hereinafter more fully pointed out.

A bank of tubes 31 is provided which extends from the water drum 21 first forwardly and upwardly, as at 31a, and then upwardly in the baffle 30 toward the top wall 14, and then into the steam and water drum 20.

Figure 3:
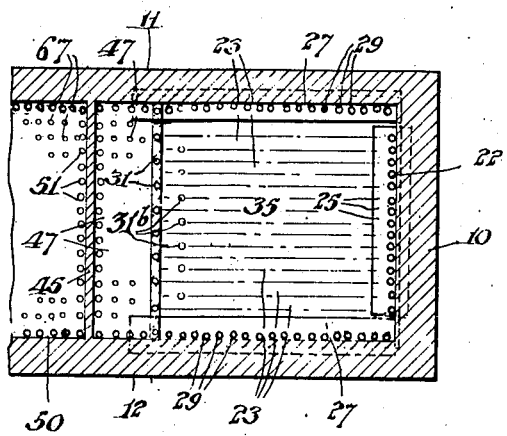
Fig. 3 is a fragmentary sectional view taken approximately on the line 3—3 of Fig. 1.

A combustion chamber 35 is thus provided enclosed within the front wall 10, the front top wall section 14a, the front sections of the side walls 11 and 12, and the baffle 30. The fuel and air for combustion in the combustion chamber 35 are supplied through the burner 16. The space 36 below the combustion chamber 35 and below the tubes 23 provides for the collection of ash and solid residues resulting from the use of certain fuels. At the outlet of the combustion chamber 35 alternate tubes 31b of the bank of tubes 31, see Figs. 1 and 3, may be offset forwardly to permit the passage of gas from the combustion chamber 35 therethrough. The tubes of the bank of tubes 31 act as a screen, and aid in the collecting of ash and the like in the space 36.

A gas duct 40 for the delivery of waste heat gases from an open hearth steel furnace or other suitable source is provided, and preferably extends through the floor 15 at the intermediate floor section 15b and from one side wall 11 to the other side wall 12. The gas duct 40 has a rear duct wall 41 extending to the lower water drum 21, and a front duct wall 42 parallel thereto extending upwardly to the bank of tubes 23. A damper 43 is provided for controlling the flow of the waste heat gases through the duct 40 and into the steam generator.

An inclined baffle 44 is provided which extends upwardly and rearwardly from the upper extremity of the front duct wall 42 and a vertical baffle 45 extends upwardly from the baffle 44, but is terminated below the intermediate top wall section 14b to permit the flow of gases thereover.

An upward pass 46 for the gases from the combustion chamber 35 is thus provided between the downwardly extending baffle 30 and the upwardly extending baffle 45, the gases being guided and directed into the upward pass by the inclined baffle 44. A bank of tubes 47 is also preferably provided in the upward pass 46 for steam generation and further cooling of the gases passing from the combustion chamber 35, and the tubes of this bank 47 extend from the water drum 21 across the discharge from the gas duct 40, then upwardly in the upward pass 46, and to the steam and water drum 20. The rearmost row of tubes of the bank of tubes 47 preferably extend along and aid in supporting the baffle 45.

An upwardly disposed baffle 48 is provided with tubes 49 along the forward face thereof upwardly from the water drum 21 to a location spaced from the top wall section 14b to permit the passage of gases over the top edge thereof. The baffle 48 provides, with the baffle 45, an upward pass 50 for waste heat gases introduced through the duct 40 and guided into the upward pass 50 by the baffle 44. The forward side of the upward pass 50 preferably is provided with a row of tubes 51 which extend forwardly and upwardly from the water drum 21, upwardly along the rear face of the baffle 45, and into the steam and water drum 20.

It will be noted that the tubes 23, the tubes 31, the tubes of the bank of tubes 47, and the row of tubes 51 extend across the entrance to the upward pass 50 and serve as a screen for the entering waste heat gases.

It will be noted that at the upper end of the upward pass 46 and the upper end of the upward pass 50 a mixing space 52 is provided within which the gases from the furnace chamber 35 and the waste heat gases will intermingle and mix prior to their exit from the mixing space 52. The gases from the upward pass 46 and from the upward pass 50 are preferably controlled by control of the burner 16 and the damper 43 so that the gases upon absorption of heat therefrom and delivery to the mixing space 52 are at approximately the same temperature. In any event the temperature of the gases delivered from the upward pass 46 must not be at an excessive temperature.

To the rear of the baffle 48 a vertical downwardly extending baffle 53 is provided, this baffle 53 extending downwardly from the steam and water drum 20 and being terminated at a location spaced from the water drum 21 for the passage of gases around the lower edge thereof. The baffle 53 provides, with the baffle 48, a downward pass 54 for the mixed gases. A bank of steam generating tubes 55 is disposed within the pass 54 and the tubes of the bank of tubes 55 extend from the water drum 21 to the upper steam and water drum 20. The forward row of tubes of the bank of tubes 55 is disposed along the baffle 48 for aiding in supporting the baffle 48, and the rear row of tubes of the bank of tubes 55 is disposed along the baffle 53 for aiding in supporting the baffle 53.

An upwardly extending wall 56 is provided to the rear of the baffle 53, and extends from the terminated below the top wall 14 to permit the front of the rear floor section 15c toward the front of the rear top wall section 14c. The wall 56 is flow of gases thereover. An upward pass 57 for the gases is thus provided between the baffle 53 and the wall 56.

A bank of tubes 58 is provided in the upward pass 57 and between the wall 56, and the baffle 53, the tubes 58 being connected between the water drum 21 and the steam and water drum 20. The forward row of tubes of the bank of tubes 58 extends along the baffle 53 for aiding in supporting the baffle 53 and the rear row of tubes of the bank of tubes 58 extends along the wall 56 for cooling the same.

In the space between the wall 56 and the rear wall 60 an economizer 61 is preferably disposed for the downward passage of the gases. The economizer 61 is provided with a feed water inlet 62, and is connected by suitable tubes 63 to the steam and water drum 20.

An induced draft fan 65 may be connected to the gas outlet of the economizer 61 for the withdrawal of gases from the steam generator and the delivery of the same to a stack (not shown). The induced draft fan 65 is of sufficient capacity to handle the waste heat gases from the open hearth steel furnace, and also the gases from the burning of the auxiliary fuel.

The steam generator illustrated is suitable for operation at a pressure of 600 to 700 pounds per square inch, but is not intended to be restricted to operation at these pressures.

A superheater 66 is provided and is connected to the steam space of the steam and water drum 20. The superheater 66 preferably includes a section of tubes 67 disposed at the upper end of the upward pass 50 and in the gas mixing space 52, and a section of tubes 68 extending downwardly in the upward pass 46, the tubes of the superheater 66 being connected to a superheated steam delivery header 70. The superheater 66 is suitable for providing from 100 to 150 degrees of superheat in the steam, but is not intended to be limited to this range.

The mode of operation of the steam generator will now be pointed out.

The fuel and air introduced from the burner 16 are burned at the desired rate in the combustion chamber 35, and the burning gases pass downwardly within the combustion chamber 35. A substantial portion of the heat generated by the combustion in the combustion chamber 35 is absorbed as radiant heat by the banks of tubes lining the chamber 35. The burning gases pass from the combustion chamber 35 through the screen provided by the tubes of the bank of tubes 31 and then pass upwardly through the upward pass 46 where a further portion of the heat in the combustion gases is given up to the tubes of the bank of tubes 47 for further steam generation, and the section 68 of the superheater 66 for superheating the steam from the drum 20. The heat absorbing surfaces which are effective in the combustion chamber 35 and in the upward pass 46 reduce the temperature of the gases prior to their entry into the mixing space 52 to an extent such that fine metallic particles carried in the waste heat gases are not rendered plastic. The waste heat gases enter through the duct 40, under the control of the damper 43, and pass upwardly through the upward pass 50 to the mixing space 52 where they mix with the gases from the combustion chamber 35. The mixed gases then pass downwardly through the downward pass 54, and then upwardly through the upward pass 57 where further quantities of heat are given up. The gases then pass downwardly through the economizer 61 where further quantities of heat are given up, and are withdrawn by the induced draft fan 65 and delivered to the stack (not shown).

In the event that it is not desired to use the waste heat gases from the open hearth steel furnace, or other source, the damper 43 is closed and the gases from the combustion chamber 35 follow the path heretofore pointed out without any mixing of waste heat gases therewith.

In the event that the steam demand is low and does not require the use of the combustion chamber 35, the waste heat gases pass upwardly through the upward pass 50, downwardly through the downward pass 54, upwardly through the upward pass 57, and downwardly through the economizer 61, and through the induced draft fan 65 in the same manner as before but lesser quantities of gas pass through than if the combustion chamber 35 were in operation.

It will be noted that the disposition of the superheater sections 67 and 68 provide for superheating of the steam for each of the alternate modes of operation.

I claim:

1. In a steam generator, a front wall, a top wall, and side walls, a steam receiving drum, banks of steam generating tubes connected to said drum for cooling said walls, a first baffle spaced from said front wall for enclosing with said walls a combustion chamber, a second baffle to the rear of said first baffle for providing a vertical combustion gas pass for the gases from said combustion chamber, a waste heat gas duct for admitting gas to the rear of said second baffle, banks of steam generating tubes connected to said drum and having portions extending across the outlet of said duct and within said combustion gas pass, additional baffles for providing additional gas passes for said combustion gases and said waste heat gases, and additional banks of steam generating tubes in said passes connected to said drum.

2. In a steam generator, a front wall, a top wall, and side walls, a transverse steam and water drum, banks of steam generating tubes connected to said drum for cooling said walls, a vertical baffle extending downwardly from said top wall and spaced from said front wall for enclosing with said walls a combustion chamber, fuel supply means in said top wall for supplying fuel for combustion in said combustion chamber, a second vertical baffle to the rear of said first baffle for providing an upward combustion gas pass for the combustion gases from said combustion chamber, a waste heat gas duct to the rear of said combustion chamber for admitting gas to the rear of said second baffle, banks of vertical steam generating tubes connected to said drum and having portions extending across the outlet of said duct, additional vertical baffles to the rear of said other baffles providing additional gas passes for said combustion gases and said waste heat gases, and additional banks of vertical steam generating tubes in said additional passes connected to said drum.

3. In a steam generator, a front wall, a top wall, and side walls, a transverse steam and water drum, banks of steam generating tubes connected to said drum for cooling said walls, a first vertical baffle spaced from said front wall for enclosing with said walls a combustion chamber, a second vertical baffle to the rear of said first baffle for providing a combustion gas pass for the gases from said combustion chamber, a waste heat gas duct for admitting gas to the rear of said second baffle, banks of vertical steam generating tubes connected to said drum and having portions extending across the outlet of said duct, additional vertical baffles to the rear of said other baffles for providing additional gas passes for said combustion gases and said waste heat gases, additional vertical banks of steam generating tubes in said additional passes connected to said drum, and a superheater connected to said drum and having a portion vertically disposed in the path of said waste heat gases and a portion vertically disposed in the combustion gas pass.

JOHN PHILLIPS BADENHAUSEN.